United States Patent [19]
Bräuer et al.

[11] Patent Number: 5,925,697
[45] Date of Patent: *Jul. 20, 1999

[54] MELT PROCESSABLE POLYURETHANES CONTAINING WAX

[75] Inventors: Wolfgang Bräuer, Leverkusen; Friedemann Müller, Neuss; Jürgen Winkler, Langenfeld; Hans-Georg Hoppe, Leichlingen; Bernhard Schulte, Krefeld; Karl-Heinz Wolf, Köln; Hans-Georg Wussow, Düsseldorf, all of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/803,564

[22] Filed: Feb. 20, 1997

Related U.S. Application Data

[30] Foreign Application Priority Data

Mar. 1, 1996 [DE] Germany .......................... 196 07 870

[51] Int. Cl.[6] .................................................. C08G 18/28
[52] U.S. Cl. ........................................... 524/219; 524/724
[58] Field of Search ...................................... 524/219, 724

[56] References Cited

U.S. PATENT DOCUMENTS

| | | | |
|---|---|---|---|
| 4,581,387 | 4/1986 | Werner et al. | 521/128 |
| 4,877,856 | 10/1989 | Hall et al. | 528/44.79 |
| 5,344,853 | 9/1994 | Knipp | 521/128 |
| 5,567,791 | 10/1996 | Brauer et al. | 528/52 |

FOREIGN PATENT DOCUMENTS

| | | |
|---|---|---|
| 2093188 | 10/1993 | Canada . |
| 5-163431 | 6/1993 | Japan . |

OTHER PUBLICATIONS

Database WPI, AN 90–366517 and JP 02 265 964 A (Dynic Corp.) Oct. 30, 1990.

R. Gächter, H. Müller (eds) Taschenbuch der Kunststoff–Additive, 3rd edition, Hanser Verlag, Munich (month unavailable) 1989, pp. 443 et seq.

*Primary Examiner*—Rachel Gorr
*Attorney, Agent, or Firm*—Joseph C. Gil; Aron Preis

[57] ABSTRACT

A thermoplastsic molding composition comprising thermoplastic polyurethane resin and about 0.05 to 2 percent of a wax is disclosed. The composition which offers processing advantages, including release and cosmetic properties, is characterized in that the wax contains acylation products of hydroxy groups and of amino groups of amino alcohols.

9 Claims, No Drawings

MELT PROCESSABLE POLYURETHANES CONTAINING WAX

This invention relates to melt processable polyurethanes containing carboxylic acid amide ester wax, to the films, sheets, fibers, and injection molded articles produced therefrom and to a process for the continuous production of these melt processable polyurethanes.

Thermoplastic polyurethane elastomers (TPU) are of industrial significance because they exhibit excellent mechanical properties and may be melt processed at low cost. Their mechanical properties may vary over a wide range thanks to the use of different chemical structural components. Summary descriptions of TPU, the properties and applications thereof may be found in Kunststoffe 68 (1978), pages 819–825 and Kautschuk, Gummi, Kunststoffe 35 (1982), pages 568–584.

TPU are synthesized from linear polyols, usually polyester or polyether polyols, organic diisocyanates and short-chain diols (chain extenders). Catalysts may also be added in order to accelerate the formation reaction. The molar ratios of the reactants may be varied over a wide range, allowing product properties to be adjusted. Molar ratios of polyols to chain extenders of 1:1 to 1:12 have proved successful. These give rise to products ranging from 70 Shore A to 75 Shore D. The melt processable polyurethane elastomers may be synthesized either in stages (prepolymer process) or by the simultaneous reaction of all components in a single stage (one-shot process). In the prepolymer process, a prepolymer containing isocyanate is formed from the polyol and the diisocyanate and, in a second stage, the prepolymer is reacted with the chain extender. The TPU may be produced continuously or discontinuously. Among the preferred industrial production processes are the belt process and the extruder process.

In addition to catalysts, it is also possible to add auxiliary substances and functional additives in the TPU compositions. Waxes, which assume important functions both during industrial production of the TPU and during processing, may be mentioned by way of example. The wax acts as a friction-reducing internal and external lubricant, improving the flow characteristics of the TPU. The wax is also intended to act as a release agent to prevent the TPU from adhering to surrounding materials (for example the mold) and as a dispersant for other additives, for example pigments and anti-blocking agents.

Prior art waxes are, for example, fatty acid esters, such as stearic acid esters and montanic acid esters, together with the metal salts thereof, as well as fatty acid amides, such as stearamides and oleamides, or also polyethylene waxes. A review of the waxes used in thermoplastics may be found in R. Gächter, H. Müller (eds.), Taschenbuch der Kunststsoff-Additive, 3rd edition, Hanser Verlag, Munich 1989, pages 443 et seq.

Due to the chemical reactivity and particular temperatures at which TPU are processed and used, many of the above-stated waxes are unsuitable for use in TPU. It is thus amide waxes with good release characteristics which have hitherto substantially been used, in particular ethylene bis-stearylamide. Montanic ester waxes exhibiting good lubricant properties at low volatility are also used (EP-A 308 683; EP-A 670 339; JP-A 5 163 431). One disadvantage of amide waxes when used in TPU is, however, their tendency to migrate. After some time, this results in the formation of a surface deposit on the article which not only degrades optical properties, but, particularly in thin-walled applications such as films, results in undesirable changes in surface-dependent properties. The use of montanic ester waxes is limited by excessively low turbidity limits. Moreover, even at elevated concentration, they do not exhibit an adequate release action.

It has now been found that the disadvantages of the known waxes may be avoided by using waxes obtainable by acylating the hydroxy and amino groups of amino alcohols.

The present invention accordingly provides a melt processable polyurethane composition comprising
(i) a thermoplastic polyurethane resin produced by reacting the polyurethane-forming components
A) organic diisocyanate,
B) linear hydroxyl-terminated polyol having a molecular weight of 500 to 5000,
C) diol or diamine chain extenders having a molecular weight of 60 to 500,
wherein the molar ratio of NCO groups in A) to the isocyanate-reactive groups in B) and C) is 0.9 to 1.2, and
(ii) 0.05 to 2%, relative to the total weight of (i) and (ii) of a wax obtainable by acylating the hydroxy and amino groups of amino alcohols.

Organic diisocyanates A) which may be considered are, for example, aliphatic, cycloaliphatic, araliphatic, heterocyclic and aromatic diisocyanates, as are described in Justus Liebigs Annalen der Chemie, 562, pp. 75–136.

The following may be mentioned by way of example: aliphatic diisocyanates, such as hexamethylene diisocyanate, cycloaliphatic diisocyanates, such as isophorone diisocyanate, 1,4-cyclohexane diisocyanate, 1-methyl-2,4-cyclohexane diisocyanate and 1-methyl-2,6-cyclohexane diisocyanate and the corresponding isomer mixtures, 4,4'-dicyclohexylmethane diisocyanate, 2,4'-dicyclohexylmethane diisocyanate and 2,2'-dicyclohexylmethane diisocyanate and the corresponding isomer mixtures, aromatic diisocyanates, such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-diisocyanatodiphenyl-1,2-ethane and 1,5-naphthylene diisocyanate. 1,6-hexamethylene diisocyanate, isophorone diisocyanate, dicyclohexylmethane diisocyanate, diphenylmethane diisocyanate isomer mixtures having a 4,4'-diphenyl-methane diisocyanate content of >96 wt. % and in particular 4,4'-diphenylmethane diisocyanate and 1,5-naphthylene diisocyanate are preferably used. The stated diisocyanates may be used individually or as mixtures with each other. They may also be used together with up to 15 wt. % (calculated relative to the total quantity of diisocyanate) of a polyisocyanate, for example triphenylmethane 4,4',4"-triisocyanate or polyphenyl-polymethylene polyisocyanates.

Linear, hydroxyl-terminated polyols having a molecular weight of 500 to 5000 are used as component B). As a result of their production process, these often contain small quantities of non-linear compounds. Consequently, they are frequently referred to as "substantially linear polyols". Polyester, polyether, polycarbonate diols or mixtures thereof are preferred.

Suitable polyether diols may be produced by reacting one or more alkylene oxides having 2 to 4 carbon atoms in the alkylene residue with a starter molecule which contains two attached hydrogen atoms. Alkylene oxides which may, for example, be mentioned are: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides may be used individually, alternatively in succession or as mixtures.

Starter molecules which may, for example, be considered are: water, amino alcohols, such as N-alkyldiethanolamines, for example, N-methyldiethanolamine, and diols, such as ethylene glycol, 1,3-propylene glycol, 1,4-butanediol and 1,6-hexanediol. Mixtures of starter molecules may also be used. Suitable polyether diols are moreover tetrahydrofuran polymerization products containing hydroxyl groups. Trifunctional polyethers may also be used in proportions of 0 to 30 wt. %, relative to the difunctional polyethers, but at most in such a quantity that a melt processable product is obtained. The substantially linear polyether diols have molecular weights from 500 to 5000. They may be used both individually and in the form of mixtures with eather other.

Suitable polyester diols may be produced, for example, from dicarboxylic acids having 2 to 12 carbon atoms, preferably 4 to 6 carbon atoms, and polyhydric alcohols. Dicarboxylic acids which may in particular be considered are: aliphatic dicarboxylic acids, such as succinic acid, glutaric acid, adipic acid, suberic acid, azelaic acid and sebacic acid and aromatic dicarboxylic acids, such as phthalic acid, isophthalic acid and terephthalic acid. The dicarboxylic acids may be used individually or as mixtures, for example in the form of a mixture of succinic, glutaric and adipic acids. In order to produce the polyester diols, it may optionally be advantageous to use, instead of the dicarboxylic acids, the corresponding dicarboxylic acid derivatives, such as carboxylic acid diesters having 1 to 4 carbon atoms in the alcohol residues, carboxylic acid anhydrides or carboxylic acid chlorides. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending upon the desired properties, the polyhydric alcohols may be used alone or optionally mixed together. Further suitable substances are esters of carbonic acid with the stated diols, in particular those having 4 to 6 carbon atoms, such as 1,4-butanediol or 1,6-hexanediol, condensation products of hydroxycarboxylic acids, for example hydroxycaproic acid and polymerization products of lactones, for example optionally substituted caprolactones. Preferably used polyester diols are ethanediol polyadipates, 1,4-butanediol polyadipates, ethanediol 1,4-butanediol polyadipates, 1,6-hexanediol neopentyl glycol polyadipates, 1,6-hexanediol, 1,4-butanediol polyadipates and polycaprolactones. The polyester diols have molecular weights of 500 to 5000 and may be used individually or in the form of mixtures with each other.

Diols or diamines having a molecular weight of 60 to 500 are use the chain extenders C), preferably aliphatic diols having 2 to 14 carbon atoms, such as for example ethanediol, 1,6-hexanediol, diethylene glycol, dipropylene glycol and in particular 1,4-butanediol. Diesters of terephthalic acid with glycols having 2 to 4 carbon atoms are, however, also suitable, such as for example terephthalic acid bisethylene glycol or terephthalic acid bis-1,4-butanediol, hydroxyalkylene ethers of hydroquinone, such as for example 1,4-di(hydroxyethyl)hydroquinone, ethoxylated bisphenols, (cyclo)aliphatic diamines, such as for example isophoronediamine, ethylenediamine, 1,2-propylenediamine, 1,3-propylenediamine, N-methyl-1,3-propylenediamine, N,N'-dimethylethylenediamine and aromatic diamines, such as for example 2,4-tolylenediamine and 2,6-tolylenediamine, 3,5-diethyl-2,4-tolylenediamine and 3,5-diethyl-2,6-tolylenediamine and primary mono-, di-, tri- or tetraalkyl-substituted 4,4'-diaminodiphenylmethanes. Mixtures of the above-stated chain extenders may also be used. Smaller quantities of triols may additionally be added.

Conventional monofunctional compounds may also be used in small quantities, for example as chain terminators or mold release auxiliaries. Alcohols, such as octanol and stearyl alcohol, or amines, such as butylamine and stearylamine may be stated by way of example.

In order to produce the TPU, the reactants, optionally in the presence of catalysts, are reacted in such quantities that the equivalent ratio of NCO groups to the sum of NCO-reactive groups, in particular the OH groups of the low molecular weight diols/triols and polyols is 0.9:1.0 to 1.2:1.0, preferably 0.95:1.0 to 1.10:1.0.

According to the invention, the composition contains 0.05 to 2 preferably 0.1 to 1.2%, relative to the weight of the TPU and wax, of a wax obtainable by acylating the hydroxy and amino groups of amino alcohols. A characteristic feature of these waxes is that they contain one to four carboxylic acid amide and one to four carboxylic acid ester groups per molecule. These may be produced in a simple manner by reacting the hydroxy and amino groups of amino alcohols with carboxylic acids or reactive carboxylic acid derivatives, for example acid chlorides. Waxes according to the invention are, however, any compounds which have the same structure as these reaction products, but were obtained using another method.

According to the invention, aliphatic amino alcohols having 2 to 10 C atoms may be used as the amino alcohols, for example ethanolamine, 2-aminopropanol, 4-aminobutanol, 8-aminooctanol and aromatic amino alcohols, such as for example aminophenol. The amino alcohols obtainable by aminolysis of epoxides may also be used, for example epoxidised fatty acid esters or bisphenol A glycidyl esters. It is, however, also possible to use compounds having two or more hydroxyl and amino functions, for example 1,3-diamino-2-propanol, 2-amino-1,3-propanediol, 2,2-diaminomethyl-1,3-propanediol.

Aliphatic, araliphatic, aromatic and cycloaliphatic carboxylic acids or the derivatives thereof may be used to produce the waxes according to the invention. Aliphatic carboxylic acids having 10 to 45 C atoms are preferred, for example oleic acid, palmitic acid, stearyl acid, montanic acid, erucic acid or cerotic acid. The carboxylic acids may be used individually or as a mixture. It may be convenient to use reactive carboxylic acid derivatives, for example acid chlorides, to produce the waxes according to the invention.

Examples of waxes according to the invention are: oleic acid amide ethyl oleate, oleic acid butyl oleate, palmitic acid amide ethyl palmitate, palmitic acid amide butyl palmitate, stearyl acid amide ethyl stearate, stearyl acid amide butyl stearate, montanic acid amide ethyl montanate, montanic acid amide butyl montanate, montanic acid amide octyl montanate, erucic acid amide ethyl erucate, oleic acid amide ethyl stearate, palmitic acid amide ethyl stearate, stearyl acid amide ethyl oleate, cerotic acid amide ethyl oleate, cerotic acid amide ethyl stearate, cerotic acid amide ethyl cerotate. Preferred waxes are those having a melting range from 70 to 100° C., for example stearyl acid amide ethyl stearate. The waxes according to the invention may be used individually or in mixtures with each other.

Catalysts for the formation of TPU are known. These include tertiary amines, such as for example triethylamine, dimethylcyclohexylamine, N-methylmorpholine, N,N'-dimethylpiperazine, 2-(dimethylaminoethoxy)ethanol, diazabicyclo(2.2.2)-octane and the like. Also included are organic metal compounds, such as titanic acid esters, iron compounds, tin compounds, for example tin diacetate, tin dioctoate, tin dilaurate or the dialkyltin salts of aliphatic carboxylic acids, such as dibutyltin diacetate, dibutyltin dilaurate or the like. Preferred catalysts are organic metal compounds, in particular titanic acid esters, compounds of iron or tin.

The composition of the invention may also include further auxiliary substances and additives. The following may be cited by way of example, lubricants not according to the invention, such as fatty acid esters, the metal salts thereof, fatty acid amides and silicone compounds, anti-blocking agents, inhibitors, stabilizers against hydrolysis, light, heat and discoloration, flame retardants, dyes, pigments, inorganic or organic fillers and reinforcing agents. Reinforcing agents are in particular fibrous reinforcing substances, such as inorganic fibers, which are produced according to the prior art and may also be coated with a size. Further details concerning the stated auxiliary substances and additives may be found in the specialist literature, for example J. H. Saunders, K. C. Frisch, High Polymers, volume XVI, Polyurethane, parts 1 and 2, Interscience Publishers, 1962 and 1964, R. Gächter, H. Müller (editor), Taschenbuch der Kunststoff-Additive, 3rd edition, Hanser Verlag, Munich 1989, or DE-A 2,901,774.

Further additives which may be incorporated into the TPU are thermoplastics, for example polycarbonates and acrylonitrile-butadiene-styrene terpolymers, in particular ABS. Other elastomers such as rubber, ethylene vinyl acetate copolymers, styrene-butadiene copolymers and other TPU may also be used. Conventional commercial plasticisers such as phosphates, phthalates, adipates, sebacates and alkylsulphonic acid esters may also suitably be incorporated.

The present invention also provides process for the production of the TPU according to the invention. These may be continuously produced in the so-called extruder process, for example in a multi-screw extruder. The TPU components A), B) and C) may be apportioned simultaneously, i.e. using the one-shot process, or in succession, i.e. using the prepolymer process. The prepolymer may here both be introduced batchwise and continuously produced in a section of the extruder or in a separate, upstream prepolymer unit.

The waxes according to the invention may be apportioned to the TPU reaction in the extruder, preferably in the first barrel section. Apportionment proceeds either at room temperature in a solid state of aggregation or in liquid form at 70 to 120° C. It is, however, also possible to apportion and compound the waxes according to the invention in the previously produced TPU which has been re-melted in an extruder. In another variant, however, they may also be homogeneously incorporated before the reaction in the polyol storage vessel, preferably at temperatures of 70 to 120° C. and apportioned to the reaction together with the polyol.

The resultant TPU products have good mechanical and elastic properties. They additionally have excellent processing characteristics. Highly uniform sheets, films and fibers may be produced from melts thereof. The sheets and films, which preferably exhibit a hardness of 65 to 95 Shore A, have very good release properties due to their low tendency to stick. Since migration does not occur, optical appearance and surface properties remain unimpaired even after extended storage.

The excellent release characteristics of the TPU products according to the invention is also evident from good mold release properties during the production of injection molded articles. As in the sheets and films, the low migration tendency means that no surface deposits are formed even after extended storage.

EXAMPLES

Examples 1 to 9

TPU Formulation

| | |
|---|---|
| Poly(1,4-butanediol adipate) (molecular weight approx. 2200): | 100 parts by weight |
| Butanediol: | 11 parts by weight |
| Diphenylmethane diisocyanate (liquid MDI, 50° C.): | 42 parts by weight |
| Tin dioctoate: | 150 ppm |

TPU Production Process

Continuous TPU reaction in a mixed tubular mixer/extruder (Werner & Pfleiderer ZSK 83 extruder) using the known prepolymer process. The barrel temperatures are between 100° C. and 220° C. Screw speed is set at 300 rpm. Total feed is 500 kg/h. The TPU is extruded as a melt strand, cooled in water and pelletized.

Apportionment of Wax

The wax or wax mixture is continuously apportioned as shown in Tables 1 and 2 a) during the above-stated continuous TPU reaction (twin screw extruder barrel section 1)

or b) during re-extrusion of the finished TPU pellets (see production process above) in the extruder (ZSK 83; wax in barrel section 1; barrel temperatures 200° C. to 220° C.; screw speed 100 rpm; the TPU is extruded as a melt strand, cooled in water and pelletized).

Film Blowing

The TPU pellets are melted in a single screw extruder (Brabender Plasticorder PS 2000-6 30/25 D single screw extruder) (feed 3 kg/h; 185–205° C.) and extruded through a film blowing head to yield a tubular film.

Production of Injection Molded Sheets

The TPU pellets are melted (melt temperature approximately 225° C.) in an injection molding machine (Mannesmann AG D 60 injection molder, 32 screw) and molded into sheets (mold temperature 40° C.; sheet dimensions: 125×45×2 mm).

The most significant properties of the resultant TPU moldings are shown in Tables 1 and 2.

TABLE 1

Film evaluation
Examples 1–3 = Comparative Examples not according to the invention

| example | wax | wt. % | apportionment of wax | film uniformity | film adhesion properties | formation of surface deposit on film 3 months storage |
|---|---|---|---|---|---|---|
| 1 | 1 | 0.14 | reaction | satisfactory | sticks | severe |
| 2 | 2 | 0.14 | reaction | poor | sticks | slight |
| 3 | 1 | 0.14 | reaction | satisfactory | sticks | severe |
|   | 2 | 0.14 | reextrusion |  |  |  |
| 4 | 1 | 0.14 | reaction | good | does not stick | none |
|   | 3 | 0.2 | reextrusion |  |  |  |
| 5 | 3 | 0.7 | reaction | good | does not stick | none |
| 6 | 3 | 0.2 | reextrusion | good | does not stick | none |
|   | 2 | 0.2 | reaction |  |  |  |
|   | 4 | 0.2 | reaction |  |  |  |

In examples 3, 4 and 6, one wax compound was added during reextrusion of pellets produced with addition of the other wax compound(s).

TABLE 2

Exudation test on injection molded sheets, storage at 80° C.
Example 7 & 9 = Comparative Examples not according to the invention

| example | wax | wt. % | apportionment of wax | formation of surface deposit immediate | after 1 week | after 2 weeks |
|---|---|---|---|---|---|---|
| 7 | 1 | 0.4 | reaction | severe | severe | severe |
| 9 | 1 | 0.4 | reaction | slight | moderate | moderate |
|   | 2 | 0.3 | reaction |   |   |   |
|   | 4 | 0.1 | reaction |   |   |   |
| 8 | 2 | 0.45 | reaction | none | none | none |
|   | 3 | 0.25 | reaction |   |   |   |
|   | 4 | 0.15 | reaction |   |   |   |
| 5 | 3 | 0.7 | reaction | none | none | very slight |

Wax 1 = Hoechst wax C (ethylene bisstearylamide)
Wax 2 = Hoechst wax E (ethyl montanate)
Wax 3 = Abril Paradigm Wax 77 (stearyl acid amide ethyl stearate)
Wax 4 = Hoechst wax OP (butyl montanate, partially saponified with Ca)

Table 1 shows that films containing the wax according to the invention, stearyl acid amide ethyl stearate, exhibit improved uniformity combined with no tendency to stick, which results in good separability of the tubular films. Moreover, the wax exhibits no discernible tendency to migrate even after an extended period. Table 2 shows that only the injection molded sheets containing the wax according to the invention, stearyl acid amide ethyl stearate, do not form a surface deposit after storage at elevated temperature.

The stated effects cannot be achieved by mixing waxes which contain amide and ester structures in separate compounds (Example 3). According to the invention, in order to achieve the desired properties, amide and ester structures must be present in a single wax compound. This compound may, however, also be used in combination with other waxes.

What is claimed:

1. A thermoplastic molding composition comprising thermoplastic polyurethane resin and about 0.05 to 2 percent of a wax, relative to the total weight of said resin and wax, said polyurethane being the reaction product of A) organic diisocyanate, B) linear hydroxyl-terminated polyol having a molecular weight of 500 to 5000, and C) diol or diamine chain extenders having a molecular weight 60 to 500, wherein molar ratio of NCO groups in A) to the isocyanate-reactive groups in B) and C) is 0.9 to 1.2, said wax containing the acylation products of hydroxy groups and of amino groups of amino alcohols.

2. The composition of claim 1, wherein said wax contains one to four carboxylic acid amide groups and one to four carboxylic acid ester groups per molecule.

3. The composition of claim 1, wherein said wax is a member selected from the group consisting of oleic acid amide ethyl oleate, oleic acid butyl oleate, palmitic acid amide ethyl palmitate, palmitic acid amide butyl palmitate, stearyl acid amide ethyl stearate, stearyl acid amide butyl stearate, montanic acid amide ethyl montanate, montanic acid amide butyl montanate, montanic acid amide octyl montanate, erucic acid amide ethyl erucate, oleic acid amide ethyl stearate, palmitic acid amide ethyl stearate, stearyl acid amide ethyl oleate, cerotic acid amide ethyl oleate, cerotic acid amide ethyl stearate and cerotic acid amide ethyl cerotate.

4. The composition of claim 1, wherein said wax has a melting range from 70 to 100° C.

5. The composition of claim 1, wherein said wax is stearyl acid amide ethyl stearate.

6. An article of manufacture comprising the composition of claim 1.

7. The composition of claim 1, wherein said molar ratio is 0.95:1.0 to 1.10:1.0.

8. The composition of claim 1, wherein said wax is present in an amount of 0.1 to 1.2 percent.

9. The thermoplastic molding composition of claim 1 wherein said linear hydroxyl-terminated polyol is at least one member selected from the group consisting of polyester diol, polyether diol and polycarbonate diol.

* * * * *